Aug. 12, 1958     H. R. NOYES ET AL     2,847,092
FLOOR LOCK
Filed March 18, 1955     2 Sheets-Sheet 1
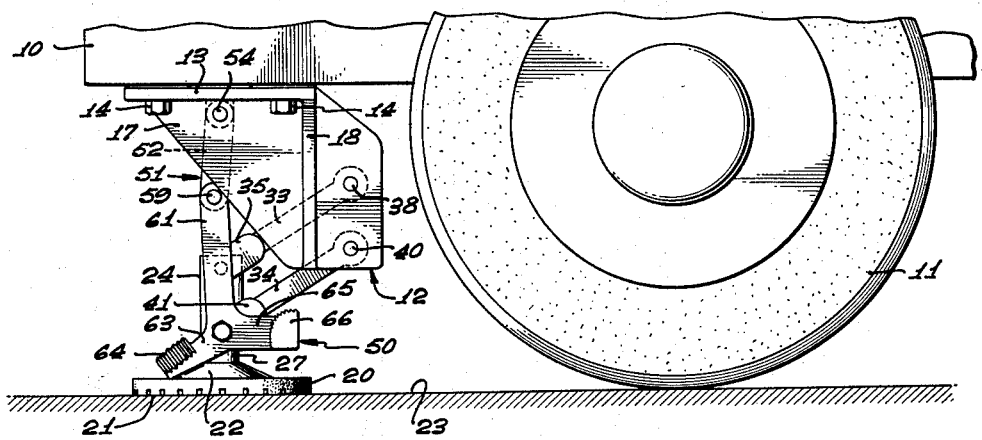
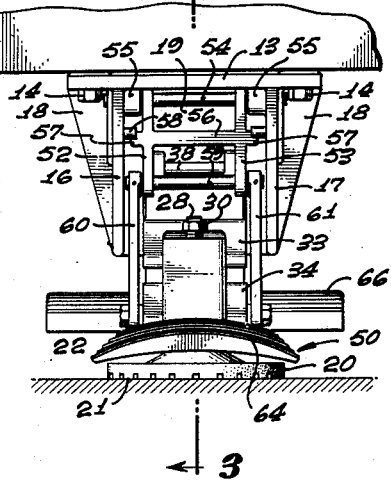
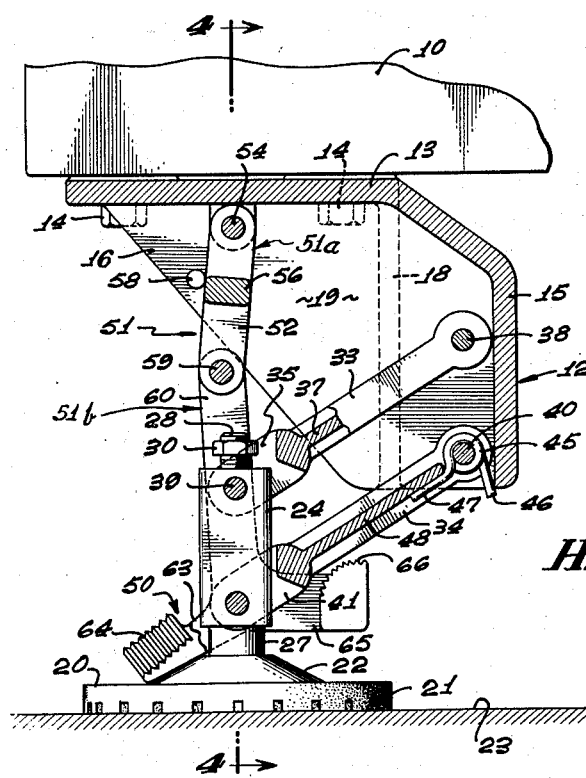
HAZLEHURST ROSS NOYES
MILTON E. ROSS
INVENTORS.
BY *Fulwider Mattingly & Huntley*
ATTORNEYS Aug. 12, 1958 H. R. NOYES ET AL 2,847,092
FLOOR LOCK
Filed March 18, 1955 2 Sheets-Sheet 2

HAZLEHURST ROSS NOYES
MILTON E. ROSS
INVENTORS.

ATTORNEYS.

United States Patent Office 2,847,092
Patented Aug. 12, 1958

2,847,092

FLOOR LOCK

Hazlehurst Ross Noyes, Hollywood, and Milton E. Ross, Burbank, Calif., assignors to Tracy S. Holmes Application March 18, 1955, Serial No. 495,175

8 Claims. (Cl. 188—5)

The present invention relates to floor locks, sometimes called floor brakes, used as a means for anchoring a free rolling truck or dolly in a selected position upon a floor or other supporting surface.

In carrying on various types of manufacturing operations, shipping operations and wherever quantities of goods are to be moved over a floor area, free rolling trucks or dollies have been employed. When the trucks or dollies are to be held in a position for loading, unloading or perhaps for the performance of various work operations on the load, they need to be anchored in place so that they cannot shift. For that purpose a various assortment of floor locks or floor brakes have been devised. In the main such locking or braking devices have employed a mechanism adapted to be forced against the floor in such a manner as to lift the truck slightly, thereby to present the resistance of the lock to movement of the truck. Some types of locks contemplate elevating adjacent wheels from contact with the floor surface. Other types may be provided with a friction floor-contacting pad forced against the floor surface to prevent shifting the truck.

Because of the fact that the bottom of the truck is often close to the floor surface riding upon caster wheels of small diameter, there is, of necessity relatively little movement or throw between the floor lock when in retracted position and when in locked position against the floor. The small amount of space available has presented a problem in the design of such devices. Although when operated over smooth floors or decks, devices of small throw have been acceptable, in actual practice many floors and decks are not smooth. Some are ordinarily rough in their general character. Others become rough due to continued wear. Hollows and projections interfere very materially with dependable operation of floor locks which have only a small throw. Those which have attempted to provide a greater throw have to a large extent been complicated, expensive, difficult to install, and subject to frequent damage.

It is therefore among the objects of the invention to provide a new and improved floor lock or floor brake which is simple in its construction and which at the same time provides ample movement so that when retracted there will be a relatively great amount of clearance between the floor surface and the lowermost portion of the floor lock.

Another object of the invention is to provide a new and improved floor lock which makes possible a considerable degree of clearance when in retracted position and which at the same time is sturdy in its design and construction and so compact when in a withdrawn position, that it cannot readily be damaged should the brake strike some solid object.

Still another object of the invention is to provide a new and improved floor lock with a simple leverage mechanism so designed and constructed that it can be quickly set in locked position by a single movement downwardly and which can also be as rapidly unlocked when it becomes necessary to move the truck to which it is attached.

Still further among the objects of the invention is to provide a floor lock which is sturdily built from relatively few moving parts and which is capable of being nested into a relatively small space protected by the housing upon which it operates at a location well removed from the floor surface over which the truck is designed to roll.

Still another object is to provide a floor lock of the class described which may be easily operated by toe pressure to either extend or retract the locking member.

The foregoing and additional objects and advantages will be apparent from a consideration of the following detailed description of one presently preferred embodiment of the invention, consideration being given likewise to the accompanying drawings in which Figure 1 is a side elevational view showing one end of a free rolling truck with the floor lock attached thereto and in a position of engagement with the floor surface;

Figure 2 is an end elevational view of the device of Figure 1;

Figure 3 is a longitudinal sectional view taken on the line 3—3 of Figure 2 and drawn to a larger scale;

Figure 4:
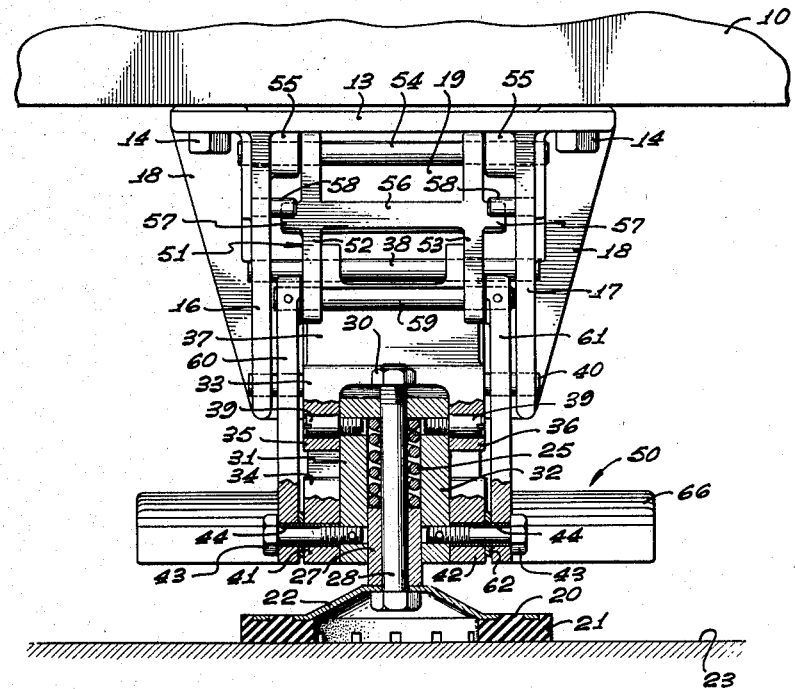
Figure 4 is a longitudinal sectional view at right angles to the view of Figure 3 taken on the line 4—4 of Figure 3.

In the embodiment chosen to illustrate the invention the floor lock is shown attached to a truck 10 carried by free rolling wheels 11, one of which is illustrated in Figure 1. The floor lock is shown attached to the underside of what may be designated as the deck or chassis of the truck 10, near enough to the edge so that the floor lock can be readily manipulated by the foot of the operator.

The floor lock comprises an arrangement of linkages mounted upon a base frame or housing 12. The housing 12 comprises an upper plate 13 by means of which the housing is secured to the truck by use of bolts 14, and includes a downwardly extending end wall 15 and side walls 16 and 17. Gusset plates 18 reinforce and strengthen the side walls in their position. It will be noted that the end wall 15 and side walls 16—17 form in effect a recess or pocket 19 in the housing.

The braking or locking element of the illustrated device includes a floor pad 20 having a floor contacting surface 21 attached to the underside of a plate 22. The floor pad 20 is adapted to thrust downwardly into locking engagement with a floor or deck 23.

For mounting the floor pad in operative position there is provided a spring carrier 24 which contains in its interior recess 26, a compression spring 25. On the plate 22 is an upwardly extending column 27 which is telescopingly received in the recess 26 wherein it is in contact with the compression spring 25. A bolt 28 forming part of the means of attachment of the floor pad extends upwardly at the center of the plate 22 through the column 27 and the compression spring 25 for which it serves as a keeper. The bolt extends through a suitable aperture in the upper end 29 of the spring carrier 24 and is secured by a nut 30. The tension of the spring may be varied by adjustment of the nut 30 on the bolt.

As can be seen best in Figure 4, the spring carrier is provided with flanges 31 and 32 on opposite sides. These flanges form a means of securing web reinforced links 33 and 34 to the carrier. The links 33 and 34 are essentially the same. By reference to the upper link 33 it may be described as comprising legs 35 and 36 made rigid with each other by a transverse web 37. The legs 35—36 at one end are attached to the side walls 16 and 17 by means of a pivot shaft 38. At the other ends the legs are attached respectively to the flanges 31 and 32 of the carrier by means of pivot screws 39. The lower link 34 is similarly mounted by means of a pivot shaft 40 to the side walls. At the opposite ends legs 41 and 42 are pivotally secured to the respective flanges 31 and 32 by bolts 43 and sleeves 44. It will be noted that the vertical spacing between centers of the pivot shafts 38 and 40 is the same as the spacing between centers of the pivot screws 39 and bolts 43. Hence, a parallelogram is provided which will assure that the spring carrier 24 is always in a vertical attitude irrespective of its motion toward and away from the housing 12.

A torsion spring 45 is wrapped around the pivot shaft 40 and has one end 46 bearing against the bottom of the end wall 15 and another end 47 bearing against the web 48 of the lower link 34 whereby to urge rotation of the link 34 about the pivot shaft 40 in a direction tending to elevate or retract the parallelogram and the attached spring-carrier 24.

The floor lock is manipulated by a pair of foot pedals indicated generally by the reference character 50. Each foot pedal is part of a toggle mechanism 51 which is interconnected between the foot 21 and housing 12. The combined foot pedal and toggle mechanism provide an over-center, releasable latch mechanism for holding the floor pad in its lowermost, or locking position.

The toggle mechanism 51 is comprised of two toggle links 51a and 51b hinged together on a transverse shaft 59. The upper link 51a is an H-shaped member having two laterally spaced parallel arms 52 and 53 interconnected by a cross-piece 56. The upper ends of the arms 52 and 53 are pivotally connected to the side walls 16 and 17 by a shaft 54 which is received in bosses 55 and is parallel to the aforementioned hinge shaft 59. The lower link 51b comprises a pair of arms 60 and 61 interconnected by a foot pedal as will be described. The arms 60 and 61 are hinged to the shaft 59 at their upper ends and pivotally connected at their lower ends to the flanges 31 and 32 by the same bolts 43 and sleeves 44 which secure the parallelogram legs 41 and 42. It will be noted that the pivotal axis defined by the bolts 43 is also parallel to the shaft 59 and hence also parallel to the upper pivotal connection shaft 54.

As can be seen best in Figure 4, the lateral spacing of the arms 60 and 61 is such that they overlie the ends of the parallelogram legs 41 and 42. Washers 62 are placed between the arms and parallelogram legs in order to minimize friction.

A pair of stops 58 is formed in the inner surface of the side walls 16 and 17 and positioned to be engaged by side lugs 57 projecting from the upper toggle link 51a, whereby to limit the clock-wise rotation of the upper link 51a about the shaft 54, such limit position being indicated in full line in Figure 3.

Each of the arms 60 and 61 is substantially T-shaped and is pivotally mounted on the bolt 43 at the cross of the T. A forward pedal arm 63 integral with each arm 60 and 61 supports a pad depressor pedal 64 which extends from one side of the device to the other and is attached to the pedal arms on both sides, as best seen in Figure 2, thus interconnecting the arms 60—61 as above stated. Another integral arm 65 of the T extends inwardly and provides support for a lock or brake reliever pedal 66. This pedal likewise extends from one side to the other whereby to engage both of the arms 60 and 61.

Figure 5:
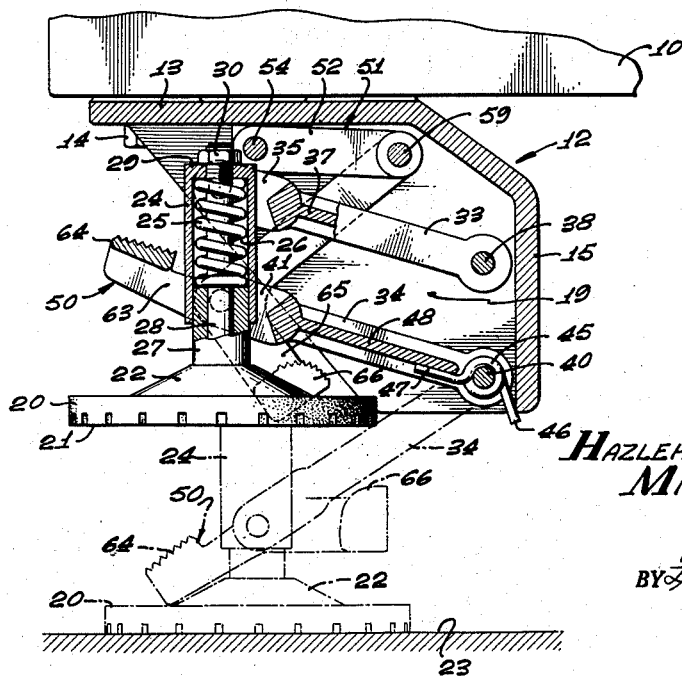
Figure 5 is a longitudinal sectional view somewhat similar to Figure 3 but showing the device in retracted position.

The floor lock is shown in retracted position by the solid lines in Figure 5. When it is desired in operation to extend the floor lock to the floor, the operator steps upon the lock depressor pedal 64. Pressure upon the lock depressor pedal moves the carrier 24 directly downwardly to the broken line position of Figure 5 Because of the parallelogram arrangement the floor pad will remain parallel to the floor. At the same time the arms 60 and 61 will rotate counter clockwise about the bolt 43 and at the same time move downwardly drawing with them the arms 52 and 53 of the upper toggle link 51a. Inasmuch as the arms 60 and 61 are pivoted about the bolts 43, the operator may continue to depress the lock depressor pedal 64 until the arms 60 and 61 are rotated with their upper ends over-center forwardly. This movement also brings the hinge shaft 59 forward of a vertical center line drawn between the pivot axes of the shaft 54 and the bolts 43. The same movement downwardly presses the floor pad against the floor pad against the floor with sufficient force to compress the compression spring 25. If desired, the throw or movement of the mechanism may be made such that the adjacent wheel 11 in each case may be lifted clear of the floor 23. After the shaft 59 reaches its over-center position, the lugs 57 prevent it from further movement by engagement with the stops 58. The engagement, however, will be emphasized by upward force of the compression spring 25 applied against the bolts 43 and the lower ends of legs 60 and 61 tending to rotate the legs 60 and 61 in a counterclockwise direction as viewed in Figures 1 and 3, thereby to maintain the lock in locked position. Stress in the compression spring 25 will also constantly urge the column 27 downwardly and press the floor contacting surface 21 of the floor pad downwardly against the floor. The vehicle will thus be firmly locked against movement on its wheels.

When it is desired to relieve the floor lock, the operator presses upon the lock reliever pedal 66. This will tend to rotate the legs 60 and 61 clockwise about the bolts 43 as viewed in Figures 1 and 2. The amount of rotation will be enough to shift the axis of shaft 59 to the opposite side of a vertical line drawn through the axes of shaft 59 and the bolts 43. Once the shaft 59 lies on the opposite side of the aforesaid vertical line, the floor pad will be automatically lifted by action of the torsion spring 45. Movement will continue until the parts are lifted to the nested position shown in Figure 5. In that position the toggle link 51a and 51b will be folded upwardly and inwardly until the shaft 59 is elevated to the position illustrated in Figure 5. At the same time the links 33 and 34 will be raised and the floor pad will also be raised to a position where all parts are compacted together well removed from the floor 23 and located substantially within the pocket or recess 19 of the housing 12.

There has accordingly been herein described a simple, compact floor lock or floor brake which by reason of its parallelogram arrangement has a considerable amount of clearance when retracted and also which, in spite of a particularly rugged construction of the moving parts, is capable of nesting into a small bundle protected by a surrounding casing which also serves as a part of the lock construction.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

The invention having been described, what is claimed is:

1. For use on a hand truck or the like, a floor lock comprising in combination: a base frame adapted to be fixed to the chassis of a truck; a movable carrier adjacent said frame and adapted for vertical movement between an upper retracted position and a lower locking position; a parallelogram linkage connected between said frame and carrier to maintain the latter in a predetermined attitude throughout said movement thereof; latching means including two toggle links hinged together on a horizontal hinge axis, the outer ends of said toggle links being pivotally attached to said frame and said carrier respectively on pivotal axes parallel to said hinge axis whereby to interconnect said frame and carrier for limited relative movement thereof, said hinge axis and the pivotal connections to said frame and carrier being adapted to lie in a common plane when said carrier is extended a maximum distance from said frame and said links being adapted to fold toward each other with said hinge axis lying on one side of said plane and substantially spaced therefrom when said carrier is in retracted position; stop means to limit the relative movement of said toggle links in a position wherein said hinge axis lies on the other side of said plane and relatively close thereto, whereby to latch said carrier against movement towards said frame; foot means mounted on said carrier below the same to engage the floor beneath said truck when said carrier is latched as aforesaid, whereby to immobilize said truck; and an operating member on one of said toggle links positioned and adapted to receive operating pressure to rotate said last named link about its said pivotal connection in a direction to move said hinge axis through said plane and permit retraction of said carrier as aforesaid.

2. For use on a hand truck or the like, a floor lock comprising in combination: a base frame adapted to be fixed to the chassis of a truck; a movable carrier adjacent said frame and adapted for vertical movement between an upper retracted position and lower locking position; a parallelogram linkage connected between said frame and carrier to maintain the latter in a predetermined attitude throughout said movement thereof; a spring connected between relatively movable members in said parallelogram linkage and stressed to yieldably urge said carrier towards said retracted position; latching means including two toggle links hinged together on a horizontal hinge axis, the outer ends of said toggle links being pivotally attached to said frame and said carrier respectively on pivotal axes parallel to said hinge axis whereby to interconnect said frame and carrier for limited relative movement thereof, said hinge axis and the pivotal connections to said frame and carrier being adapted to lie in a common plane when said carrier is extended a maximum distance from said frame and said links being adapted to fold toward each other with said hinge axis lying on one side of said plane and substantially spaced therefrom when said carrier is in retracted position; stop means to limit the relative movement of said toggle links in a position wherein said hinge axis lies on the other side of said plane and relatively close thereto, whereby to latch said carrier against movement towards said frame; foot means mounted on said carrier below the same to engage the floor beneath said truck when said carrier is latched as aforesaid, whereby to immobilize said truck; and an operating member on one of said toggle links positioned and adapted to receive operating pressure to rotate said last named link about its said pivotal connection in a direction to move said hinge axis through said plane and permit retraction of said carrier as aforesaid.

3. For use on a hand truck or the like, a floor lock comprising in combination: a base frame adapted to be fixed to the chassis of a truck; a movable carrier adjacent said frame and adapted for vertical movement between an upper retracted position and a lower locking position; a parallelogram linkage connected between said frame and carrier to maintain the latter in a predetermined attitude throughout said movement thereof; latching means including two toggle links hinged together on a horizontal hinge axis, the outer ends of said toggle links being pivotally attached to said frame and said carrier respectively on pivotal axes parallel to said hinge axis whereby to interconnect said frame and carrier for limited relative movement thereof, said hinge axis and the pivotal connections to said frame and carrier being adapted to lie in a common plane when said carrier is extended a maximum distance from said frame and said links being adapted to fold toward each other with said hinge axis lying on one side of said plane and substantially spaced therefrom when said carrier is in retracted position; stop means to limit the relative movement of said toggle links in a position wherein said hinge axis lies on the other side of said plane and relatively close thereto, whereby to latch said carrier against movement towards said frame; foot means mounted on said carrier below the same to engage the floor beneath said truck when said carrier is latched as aforesaid, whereby to immobilize said truck; and operating means including a first pressure member on one of said toggle links positioned and adapted to receive operating pressure to rotate said last named link about its pivotal connection in a direction to carry said hinge axis from said folded position through said plane to said limit position and a second pressure member on one of said links positioned and adapted to receive operating pressure to rotate said last named link in a direction to return said hinge axis through said plane to said folded position thereof.

4. For use on a hand truck or the like, a floor lock comprising in combination: a base frame having a horizontal plate adapted for attachment to the underside of a truck chassis and depending parallel side walls spaced to define a recess therebetween; a movable carrier having a central vertical bore and vertically extending lateral flanges; a pair of substantially identical parallel links each having a pair of horizontally spaced arms embracing said carrier, said arms being interconnected by an integral cross-piece intermediate the ends thereof and the opposite ends of said arms in each link being respectively pivotally connected to said flanges and said side walls on four mutually parallel axes whereby to guide said carrier in downward curvilinear movement from a retracted position wherein said carrier and links lie substantially within said recess to an extended position wherein said carrier is substantially spaced below said plate, said links, flanges, and side walls forming a parallelogram linkage whereby to maintain said bore always vertical during said movement of said carrier; latching means including two toggle links hinged together on a horizontal hinge axis, the outer ends of said toggle links being pivotally attached to said side walls and carrier respectively on axes parallel to said hinge axis to movably interconnect said carrier and frame, said hinge axis and the pivotal connections to said side walls and carrier being in a common plane when said carrier is extended a maximum distance from said plate and said links being adapted to fold toward each other with said hinge axis lying on one side of said plane and substantially spaced therefrom when said carrier is in said retracted position; inwardly projecting stops formed on the inner surfaces of said side walls and adapted to engage one of said toggle links to limit the relative movement of the toggle links in a position wherein said hinge axis lies on the other side of said plane and relatively close thereto, whereby to latch said carrier against movement toward said plate; a pair of oppositely and transversely extending pedal arms formed on the lowermost of said toggle links adjacent the pivotal connection thereof to said carrier, said arms having pressure receiving pedals thereon to receive pressure selectively to rotate said toggle link in one direction to move said hinge axis from said folded position thereof through said plane to said limit position or conversely from said limit position through said plane to said folded positions; a torsion spring mounted on one of the pivot axes of said parallelogram and connected and stressed to urge said carrier to retracted position; and a foot member having an upstanding attachment member received in said bore to mount said foot member on said carrier below the same to engage the floor beneath said plate when said carrier is extended as aforesaid.

5. For use on a hand truck or the like, a floor lock comprising in combination: a movable carrier adapted to be positioned beneath the chassis of a truck for vertical movement between an upper retracted position and a lower locking position; a parallelogram linkage having means to connect the same to said chassis and also connected to said carrier to maintain the latter in a predetermined attitude throughout said movement thereof; latching means including two toggle links hinged together on a horizontal hinge axis, the free end of one of said toggle links being pivotally attached to said carrier on a pivotal axis parallel to said hinge axis and the free end of the other of said links having means to pivotally attach the same to said chassis whereby to interconnect said chassis and carrier for limited relative movement thereof, said hinge axis and pivotal connections at the ends of said links being adapted to lie in a common plane when said carrier is extended a maximum distance from said chassis and said links being adapted to fold toward each other with said hinge axis lying on one side of said plane and substantially spaced therefrom when said carrier is in retracted position; stop means to limit the relative movement of said toggle links in a position wherein said hinge axis lies on the other side of said plane and relatively close thereto whereby to latch said carrier against movement toward said chassis; foot means on said carrier below the same to engage the floor beneath said chassis when said carrier is latched as aforesaid whereby to immobilize said truck; and an operating member on one of said toggle links positioned and adapted to receive operating pressure to rotate said last-named link about its said pivotal connection in a direction to move said hinge axis through said plane and permit retraction of said carrier as aforesaid.

6. For use on a hand truck or the like, a floor lock comprising in combination: a movable carrier adapted to be positioned beneath the chassis of a truck for vertical movement between an upper retracted position and a lower locking position; a parallelogram linkage having means to connect the same to said chassis and also connected to said carrier to maintain the latter in a predeterminal attitude throughout said movement thereof; latching means including two toggle links hinged together on a horizontal hinge axis, the free end of one of said toggle links being pivotally attached to said carrier on a pivotal axis parallel to said hinge axis and the free end of the other of said links having means to pivotally attach the same to said chassis whereby to interconnect said chassis and carrier for limited relative movement thereof, said hinge axis and pivotal connections at the ends of said links being adapted to lie in a common plane when said carrier is extended a maximum distance from said chassis and said links being adapted to fold toward each other with said hinge axis lying on one side of said plane and substantially spaced therefrom when said carrier is in retracted position; stop means to limit the relative movement of said toggle links in a position wherein said hinge axis lies on the other side of said plane and relatively close thereto whereby to latch said carrier against movement toward said chassis; foot means on said carrier below the same to engage the floor beneath said chassis when said carrier is latched as aforesaid whereby to immobilize said truck; an operating member on one of said toggle links positioned and adapted to receive operating pressure to rotate said last-named link about its said pivotal connection in a direction to move said hinge axis through said plane and permit retraction of said carrier as aforesaid; and spring means having one end anchored with respect to said chassis and the other end connected to said carrier, said spring being stressed to urge said carrier toward said retracted position thereof.

7. For use on a hand truck or the like, a floor lock comprising in combination: a movable carrier adapted to be positioned beneath the chassis of a truck for vertical movement between an upper retracted position and a lower locking position; a parallelogram linkage having means to connect the same to said chassis and also connected to said carrier to maintain the latter in a predetermined attitude throughout said movement thereof; latching means including toggle links hinged together on a horizontal hinge axis, the free end of one of said toggle links being pivotally attached to said carrier on a pivotal axis parallel to said hinge axis and the free end of the other of said links having means to pivotally attach the same to said chassis whereby to interconnect said chassis and carrier for limited relative movement thereof, said hinge axis and pivotal connections at the ends of said links being adapted to lie in a common plane when said carrier is extended a maximum distance from said chassis and said links being adapted to fold toward each other with said hinge axis lying on one side of said plane and substantially spaced therefrom when said carrier is in retracted position; stop means to limit the relative movement of said toggle links in a position wherein said hinge axis lies on the other side of said plane and relatively close thereto whereby to latch said carrier against movement toward said chassis; foot means on said carrier below the same to engage the floor beneath said chassis when said carrier is latched as aforesaid whereby to immobilize said truck; and an operating member formed on the toggle link connected to said carrier, said member extending substantially horizontally from said last-named link when said carrier is in said lower locked position, and said member being adapted to receive operating pressure in a vertical direction to rotate said last-named link about its pivotal connection in a direction to move said hinge axis through said plane and permit retraction of said carrier as aforesaid.

8. For use on a hand truck or the like, a floor lock comprising in combination: a movable carrier adapted to be positioned beneath the chassis of a truck for vertical movement between an upper retracted position and a lower locking position; a parallelogram linkage having means to connect the same to said chassis and also connected to said carrier to maintain the latter in a predetermined attitude throughout said movement thereof; latching means including two toggle links hinged together on a horizontal hinge axis, the free end of one of said toggle links being pivotally attached to said carrier on a pivotal axis parallel to said hinge axis and the free end of the other of said links having means to pivotally attach the same to said chassis whereby to interconnect said chassis and carrier for limited relative movement thereof, said hinge axis and pivotal connections at the ends of said links being adapted to lie in a common plane when said carrier is extended a maximum distance from said chassis and said links being adapted to fold toward each other with said hinge axis lying on one side of said plane and substantially spaced therefrom when said carrier is in retracted position; stop means to limit the relative movement of said toggle links in a position wherein said hinge axis lies on the other side of said plane and relatively close thereto whereby to latch said carrier against movement toward said chassis; foot means on said carrier below the same to engage the floor beneath said chassis when said carrier is latched as aforesaid whereby to immobilize said truck; a retracting member formed on the toggle link connected to said carrier, said member extending substantially horizontally from said last-named link when said carrier is in said lower locked position, and said member being adapted to receive operating pressure in a vertical direction to rotate said last-named link about its pivotal connection in a direction to move said hinge axis through said plane and permit retraction of said carrier as aforesaid; and a locking pedal formed on the same link as said retracting member, said locking pedal extending in the opposite direction from that of said retracting member and having means thereon to receive pressure to rotate said last-named link in a direction opposite to that effected by said retracting member whereby to move said hinge axis through said plane toward said stop means whereby to extend said carrier to said lower locking position thereof.

References Cited in the file of this patent

UNITED STATES PATENTS

| | | |
|---|---|---|
| 1,085,438 | Knight | Jan. 27, 1914 |
| 2,360,874 | Herold | Oct. 24, 1944 |
| 2,712,366 | Skupas | July 5, 1955 |